US008556705B2

(12) United States Patent
Gingher

(10) Patent No.: US 8,556,705 B2
(45) Date of Patent: Oct. 15, 2013

(54) SYSTEM AND METHOD FOR SUBSTANTIALLY REMOVING CHANCE FROM A WORD GAME COMPRISING CHANCE AND SKILL

(76) Inventor: Robert G. Gingher, West Islip, NY (US)

( * ) Notice: Subject to any disclaimer, the term of this patent is extended or adjusted under 35 U.S.C. 154(b) by 0 days.

(21) Appl. No.: 13/544,719

(22) Filed: Jul. 9, 2012

(65) Prior Publication Data

US 2012/0276970 A1 Nov. 1, 2012

Related U.S. Application Data

(63) Continuation-in-part of application No. 12/951,812, filed on Nov. 22, 2010, now Pat. No. 8,235,800.

(60) Provisional application No. 61/263,574, filed on Nov. 23, 2009.

(51) Int. Cl.
*G06F 17/00* (2006.01)

(52) U.S. Cl.
USPC ............................................. 463/22

(58) Field of Classification Search
USPC .................................................... 463/16–25
See application file for complete search history.

(56) References Cited

U.S. PATENT DOCUMENTS

| 6,572,111 | B1 | 6/2003 | Samberg |
| 7,104,542 | B2 | 9/2006 | Peterson |
| 7,207,563 | B2 | 4/2007 | Samberg |
| 8,142,283 | B2 | 3/2012 | Lutnick et al. |
| 2003/0230848 | A1* | 12/2003 | Mellerowicz ................. 273/272 |
| 2007/0037623 | A1 | 2/2007 | Romik |
| 2009/0093300 | A1 | 4/2009 | Lutnick et al. |
| 2010/0311488 | A1 | 12/2010 | Miller et al. |
| 2010/0311489 | A1 | 12/2010 | Miller et al. |
| 2010/0311490 | A1 | 12/2010 | Miller et al. |
| 2010/0311493 | A1 | 12/2010 | Miller et al. |
| 2010/0311494 | A1 | 12/2010 | Miller et al. |
| 2010/0312625 | A1 | 12/2010 | Miller et al. |
| 2011/0065490 | A1* | 3/2011 | Lutnick ........................... 463/16 |
| 2012/0034962 | A1* | 2/2012 | Amaitis ........................ 463/13 |
| 2012/0264495 | A1* | 10/2012 | Amaitis et al. .................. 463/10 |

OTHER PUBLICATIONS

Poker Hand Ranking Chart, www.tightpoker.com/poker_hands. html (viewed Nov. 22, 2009).
Expected Value chart by position, www.tightpoker.com/hands/ev_position.html (viewed Nov. 22, 2009).

* cited by examiner

*Primary Examiner* — Ronald Laneau
(74) *Attorney, Agent, or Firm* — Robert G. Gingher

(57) ABSTRACT

The system and methods of the present application comprise one or more computers for substantially removing the element of chance in a contest that would normally be on whose outcome would be determined by a mixture of chance and skill. The system comprises one or more computers that interact with a user in order to reduce or eliminate the elements of chance, thereby forcing the contest to obey the law of averages within a finite number of iterations of the contest, thereby reducing variance and increasing the success of skillful players.

14 Claims, 6 Drawing Sheets

SYSTEM AND METHOD FOR SUBSTANTIALLY REMOVING CHANCE FROM A WORD GAME COMPRISING CHANCE AND SKILL

CROSS REFERENCE TO RELATED APPLICATIONS

This application is a continuation-in-part of U.S. patent application Ser. No. 12/951,812, filed Nov. 22, 2010, entitled SYSTEM AND METHOD FOR SUBSTANTIALLY REMOVING CHANCE FROM A MIXED CONTEST OF CHANCE AND SKILL, which in turn claims the benefit of U.S. Provisional Patent Application Ser. No. 61/263,574, filed Nov. 23, 2009, entitled SYSTEM AND METHOD FOR SUBSTANTIALLY REMOVING CHANCE FROM A MIXED CONTEST OF CHANCE AND SKILL, each of which is incorporated by reference herein.

FIELD OF THE INVENTION

The present invention relates generally to the field of mixed games of chance and skill, such as for example poker, whose outcomes depend in part on the skill of the players, and in particular to the use of a computer to reduce or eliminate the element of chance from a game.

BACKGROUND OF THE INVENTION

Games of chance such as card games like poker and blackjack are widely played in various casino facilities and online, such as over the Internet or other computer networks. Typically the players in a tournament pay an entry fee, which allows them to sit at one of several tables where they compete against other players at the table, and every player in the tournament. At a table the players receive different cards, and a table scores its results independently of the results at other tables. The outcome of for example a poker game or tournament depends to an extent upon the skill of the players, but also depends upon chance, or how good are the cards that the players receive.

Games of chance such as card games are regulated by gambling laws in many jurisdictions. Some jurisdictions, such as Nevada, currently prohibit on-line games of chance for money. Such laws were most likely motivated by that legislature's desire to protect the brick-and-mortar establishments that contribute so generously toward the elections of such legislators. Other jurisdictions regulate, but do not prohibit contests of skill. U.S. federal legislators enacted the Unlawful Internet Gaming Enforcement Act (UIGEA or The Act), that prohibits any person engaged in the business of betting or wagering from knowingly accepting payments in connection with the participation of another person in unlawful Internet gambling. Federal regulators state that the Act generally defines "unlawful Internet gambling" as "placing, receiving, or otherwise knowingly transmitting a bet or wager by any means which involves the use, at least in part, of the Internet where such bet or wager is unlawful under any applicable Federal or State law in the State or Tribal lands in which the bet or wager is initiated, received, or otherwise made. The Act states that its provisions should not be construed to alter, limit, or extend any Federal or State law or Tribal-State compact prohibiting, permitting, or regulating gambling within the United States. The Act does not spell out which activities are legal and which are illegal, but rather relies on the underlying substantive Federal and State laws." UIGEA as implemented by the Federal Reserve System, 12 CFR Part 233, Regulation GG; Docket No. R-1298 and Department of the Treasury, 31 CFR Part 132, RIN 1505-AB78.

Traditionally, card games such as poker, rummy, bridge or other games such as bingo are classified as games of chance or a mix of chance and skill. In most cases, the playing of games of chance for money or prizes is classified as gambling and therefore regulated or prohibited, and the operators of such games may be found to be in violation of criminal statutes. It is well-known that, to be classified as gambling, the game must be a game of chance where the outcome of the game is determined predominately or fully by the element of chance, there must be a monetary consideration to participate in the game and there must be the ability to win money or monies having equal or greater value than that of the consideration.

With the substantial reduction removal of the element of chance from a game, the game becomes a game of skill and in most cases a game of skill does not constitute gambling. The interpretation of skill as applied to a game is that a game can be considered skilful if a player can significantly affect the outcome of play as a result of his or her own actions. Devices used for the purpose of gambling are based predominately on the element of chance and thus a player would have little or no control of the outcome of the game. Games of skill are commonly played, and in particular there are methods for playing a game such as poker as a game of skill.

To play cards as a game of skill, it is necessary that the random generation of hands that are dealt to players in competition be eliminated. In traditional skill-based card games, the randomness of dealt cards during the play of a game can be reduced by duplicating the hands dealt to players in the same tournament group, such that competing players on different tables playing hands have the opportunity to play identical cards.

During the middle of the 20th century, the game of duplicate bridge became popular. In duplicate bridge, players at a table are dealt hands that are subsequently passed on to another table, and then to another one, and so on. Consequently, a competing pair plays the same deals that any number of other pairs play, with the differences in results being the basis for each pair's final score. Duplicate bridge began its rise in the '30s and continues to be popular worldwide.

Other card games are currently played as games of skill using the same principle used in duplicate bridge. The cards dealt are duplicated for each player in a tournament group and for a player to win, they must rely on their skill or speed. Speed may be the objective in games such as skill bingo where the player that calls "bingo" first when a winning card is discovered is deemed the winner.

In a duplicate poker tournament each table has only one member from each tournament group and each tournament group is represented at each table. This enables players at a particular table to play different cards and maintain game feel and playability while competing against players in the identical seats at the other tournament tables who are playing identical hands. For example, the players seated at seat #1 at each table are compared to determine how well they fared against the other players at their table. The collection of players located at seat #1 of each table is designated as tournament group #1. Similarly, each other seat number has a corresponding tournament group such that each table has the identical number of seats and therefore each tournament group has a representative seated at each table.

Another implementation of skill poker includes each player at a table playing identical hands and thus forming a tournament group, however this implementation is less common as it does not maintain game feel and playability. See U.S. Pat. No. 7,104,542, incorporated by reference herein.

However, duplicate poker has a drawback in that it must be played on more than one table, and played against players having different skill levels between the tables played thereon, thereby making the game unequal for participants whose performance is measured against each other in a particular group, because each player in a group is faced with a different set of adversarial players.

Further, alternative chip scoring methods have been devised to score such a duplicate poker game, which further deviates from the familiarity of a game played by well-known rules. See U.S. Patent Application Publication No. 2007/0037623, incorporated by reference herein. In other words, while duplicate games may help reduce the effects of chance in a game, it is a different game with different scoring rules that may reduce its popularity with the card playing public. What is needed is a game that follows the ordinary rules and scoring, yet reduces or eliminates the element of chance.

BRIEF SUMMARY OF THE INVENTION

The system and methods of the present application comprise one or more computers for substantially removing the element of chance in a contest that would normally be on whose outcome would be determined by a mixture of chance and skill. The system comprises one or more computers that interact with a user in order to reduce or eliminate the elements of chance, thereby forcing the contest to obey the law of averages within a finite number of iterations of the contest, thereby reducing variance and increasing the success of skillful players.

In one aspect, the present invention is directed to a method for players to play a card game at a computerized gaming table interface, the method comprising: a computer random-shuffling and dealing representations of cards from a simulated deck to each player participating in the card game at the computerized gaming table interface, to enable the player to play a hand in the card game; the computer determining a relative strength of cards dealt to each player; the computer tracking relative strength of previously played hands dealt to each player; and the computer creating an ordered arrangement of cards in one or more new decks for subsequent hands to be played by the players, such that each player is provided with an approximately equal chance of winning an equal number of hands when playing a plurality of hands dealt from the new decks and the previously played hands.

In another aspect of the present invention, determining relative strength of cards dealt to each player further comprises accounting for position of each player and determining expectation value for a starting hand provided to a player in a particular seating position.

In another aspect of the present invention, creating the ordered arrangement further comprises equalizing the chances of winning a hand at every point in the play of a previously played hand for each player at the computerized gaming table.

In another aspect of the present invention, creating the ordered arrangement further comprises changing suits of a previously played hand.

In another aspect of the present invention, creating the ordered arrangement further comprises changing the order of presentation of the cards in a new deck from a previously played hand.

In another aspect of the present invention, creating the ordered arrangement further comprises changing rank of cards from a previously played hand so that odds of winning a hand from a new deck is substantially the same as a previously played hand.

In another aspect of the present invention, creating the ordered arrangement further comprises equalizing the odds of winning more than one hand dealt from more than one new deck.

In yet another aspect, the present invention is directed to a computer system enabling players to play a card game, comprising: a processor; a memory; a computerized gaming table interface comprising a display; and software stored on a computer-readable medium which, when loaded and run by the processor, causes the processor to perform steps of: random-shuffling and dealing representations of cards from a simulated deck to each player participating in the card game at the computerized gaming table interface, to enable each player to play a hand in the card game; determining a relative strength of cards dealt to each player; tracking relative strength of previously played hands dealt to each player; and creating an ordered arrangement of cards in one or more new decks for subsequent hands to be played by the players, such that each player is provided with an approximately equal chance of winning an equal number of hands when playing a plurality of hands dealt from the new decks and the previously played hands.

In another aspect of the present invention, the software stored on a computer-readable medium, when loaded and run by the processor, causes the processor to perform additional steps of accounting for position of each player and determining expectation value for a starting hand provided to a player in a particular seating position.

In another aspect of the present invention, the software stored on a computer-readable medium, when loaded and run by the processor, causes the processor to perform additional steps of equalizing the chances of winning a hand at every point in the play of a previously played hand for each player at the computerized gaming table.

In another aspect of the present invention, the software stored on a computer-readable medium, when loaded and run by the processor, causes the processor to perform additional steps of changing suits of a previously played hand.

In another aspect of the present invention, the software stored on a computer-readable medium, when loaded and run by the processor, causes the processor to perform additional steps of changing the order of presentation of the cards in a new deck from a previously played hand.

In another aspect of the present invention, the software stored on a computer-readable medium, when loaded and run by the processor, causes the processor to perform additional steps of changing rank of cards from a previously played hand so that odds of winning a hand from a new deck is substantially the same as a previously played hand.

In another aspect of the present invention, the software stored on a computer-readable medium, when loaded and run by the processor, causes the processor to perform additional steps of equalizing the odds of winning more than one hand dealt from more than one new deck.

In yet another aspect, the present invention is directed to a computer system for playing a skill-based game of heads-up, no-limit Texas hold'em poker tournament on the Internet between two players, the system comprising: a computer server comprising a memory; at least one player's computer in communication with the computer server through the Internet, comprising a display and user interface; and software stored on one or more computer-readable media which, when loaded and run by the computer server and the player's computer, causes the computer server to perform steps of: random-shuffling and dealing representations of cards from a simulated deck to each player participating in the heads-up, no-limit Texas hold'em poker tournament; determining a relative strength of hole cards dealt to each player; tracking relative strength of previously played hands dealt to each player; and creating an ordered arrangement of cards in one or more new decks for subsequent hands to be played by the two players, such that each player is provided with an approximately equal chance of winning an equal number of hands when playing a plurality of hands dealt from the new decks and the previously played hands.

DETAILED DESCRIPTION OF THE INVENTION

Figure 1:
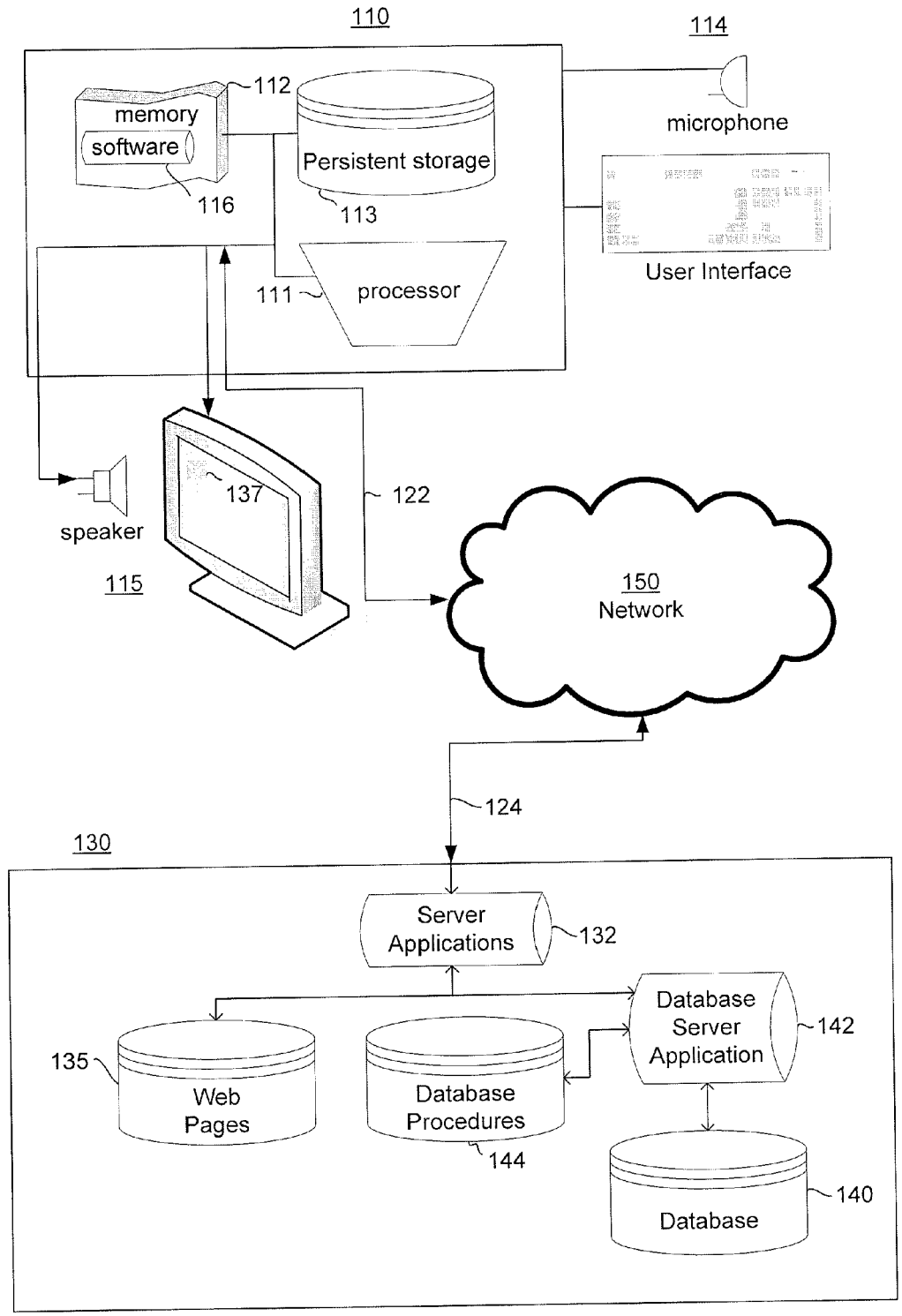
FIG. 1 is a block diagram that illustrates a computer architecture of a preferred embodiment of the present invention.

It is well known that a person who possesses superior skill playing in contests of mixed chance and skill will, over time, perform better than those persons of limited skill. The law of averages will eventually provide a skilled player with the benefit of overcoming variance, or colloquially, so-called "bad-beats." But a skillful player may require a measure of patience to endure variance over a large number of hands before ultimately succeeding.

The present invention comprises a system and methods for substantially removing the element of chance in a contest that would normally be on whose outcome would be determined by a mixture of chance and skill. The system comprises one or more computers that interact with a user to reduce or eliminate the elements of chance, thereby forcing the contest to obey the law of averages over fewer iterations of the contest, thereby reducing variance and increasing the success of skillful players.

The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, Visual Basic, Python, CGI, PHP or the like, with the various algorithms being implemented with any combination of data structures, objects, processes, routines or other programming elements. The object code created for the computers can preferably be executed by any general purpose computer such as a personal computer having an appropriate operating system such as Windows™ or MAC™ and an appropriate browser such as Internet Explorer,™ Netscape™ or Safari.™

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

System Architecture

FIG. 1 is a block diagram that illustrates a computer architecture of a preferred embodiment of the present invention. In a preferred embodiment, the system and method of the present invention are directed to a computer in communication with a server through the Internet. Referring to FIG. 1, one or more client computers 110 and a server computer 130 are coupled over communication links 122, 124, respectively to network 150. Network 150 may comprise, for example, the Internet, a wide area network (WAN), or a local area network (LAN). Together, software that executes on a client computer 110 and on server computer 130 forms a client/server software system.

Client computer 110 comprises a processor 111, memory 112, user interface 114 and a display 115. Memory 112 may also include persistent storage 113. In a preferred embodiment, software on client computer 110 comprises a Web browser 116, such as Internet Explorer,™ Netscape,™ Firefox,™ Safari™ or other Web browser pre-loaded into memory 112 of client computer 110 or readily-available for download from the Internet into memory 112. Such browsers retrieve Web pages 135 from a Web server 130 in response to inputs on user interface 114. Web pages 135 are loaded into memory 112 and then rendered on display 115. In an alternative embodiment, a dedicated, client-based application is installed on client computer 110, wherein such client-based application may use alternate communication protocols from HTTP (hyper-text transfer protocol).

User interface 114 comprises controls that are preferably graphically represented buttons 137, with symbols commonly found in many Web pages to permit entry of information or selection of actions. User interface 114 may be a keyboard, mouse or other pointing device, or other information or control input device that affects the operation of client computer 110, as is well known in the art. User interface 114 may also comprise a microphone that provides the user with a means to convey digitized audio information.

Display 115 comprises a CRT (cathode ray tube) or LCD (liquid crystal display), or other visual display device as is commonly known in the art. Display 115 may further comprise speakers that receive digitized audio signals and emit audio output audible to the user. As is well known in the art, speakers may also be in a headset that comprises a microphone.

Software on server computer 130 preferably comprises a Web server application 132. Web server application 132 listens for TCP/IP (transport control protocol/Internet protocol) connections on a well-known port and receives standard HTTP (hyper-text transfer protocol) requests on that port that identifies particular URL (universal resource locator) that indicates Web pages 135 and other information requested, typically by Web browser 116 on client computer 110. Preferably, Web server application 132 comprises Apache and a collection of software modules that generate HTML (hyper-text markup language) Web pages 135. In alternate embodiments, the functions performed by server computer 130 are split among several server computers, for example, having components of Web server application 132 executed on computers different from database server application 142 (described below). Furthermore, these servers may be geographically separated and, for example, coupled through network 150.

In addition, server computer 130 includes a database 140 that includes information related to people and books. A database server application 142 is coupled to database 140 and provides an interface to the information stored in database 140 to other application software modules that execute on server computer 130. In a preferred embodiment, database 140 is a relational database, which includes a number of interrelated tables. Database server application 142 is preferably an SQL (structured query language) server that accepts queries according to an SQL syntax and provides responses to those queries. Database server application 142 can perform stored database procedures 144 comprising complex queries stored in SQL syntax on server computer 130. Such queries may involve multiple fetching processes from more than one table in the tables that comprise database 140. Stored database procedures 144 are stored in a file system on server computer 130.

Although FIG. 1 illustrates only one server computer 130 and one client computer 110 in communication through network 150, it should be understood that different numbers of computers may be utilized, at the very least, one client computer per game player. In one example, the network 150 may include a plurality of network computers and tens or hundreds of computers, all of which may be interconnected via the network 150. In a preferred embodiment, a plurality of client computers 110 are able to simultaneously connect to the server 130. The communication links 122, 124 may be provided as a dedicated hardwired link or a wireless link. Although the communication links 122, 124 are shown as a single data link, they may comprise multiple data links.

The networked computers, client computer 110 and server computer 130, may be provided in many different geographic locations including a home, a casino, a cruise ship, different areas of the same city, or they may be located in different states or even countries. Network 150 may include a plurality of network computers or server computers (not shown), each of which may be operatively interconnected. Where the network 150 comprises the Internet, data communication may take place over communication links via an Internet communication protocol (UDP/IP or TCP/IP). Where the network 150 comprises a wireless network, data communication may take place over communication links via a wireless data protocol such as CDMA2000 or W-CDMA. Similarly, where the network communications comprise data, voice and video, communication may take place via an Internet communication protocol or a wireless protocol.

System Operation

The following discussion describes the methods performed by the inventive system. To provide context, the operation of an exemplary, preferred embodiment of client/server application 132 and database server application 142 are described. The description is based on that actions that the computers will perform when the applications are loaded and run.

But first, it should be noted that it is impracticable to play some games in the physical world. The use of physical gaming cards introduces a massive amount of organization that would be needed for even a small poker club to operate. With games of chance, shuffling the deck of cards is used to quickly randomize cards and dealing are straightforward activities. In a gambling scenario, it is well known that many hands can be played in even a one-hour period. To implement a game of skill and reduce or eliminate chance, however, the organization of hands in new decks to be dealt for each tournament is required. A typical poker game such as Texas Hold'em can play approximately 30 hands in a one hour period and this translates to 3,000 hands played in a tournament of 100 players per hour, which is typical for a medium sized poker club. This extrapolates to approximately 72,000 pre-ordered hands that must be created to accommodate a medium sized poker house for one 24-hour period of playing time. It can be seen that since the organization of cards needed to play a game of skill can become a time consuming task, a convenient method would be needed to feasibly implement a tournament of skill poker. Such convenience is achieved and the present inventive gaming methods that may only be made possible through the use of a high-speed computing apparatus.

Conventional games of chance such as poker and blackjack have associated with them strict rules to combat cheating by the players or collusion between the players and the dealer. Even with random card shuffling, players may identify patterns of cards that are not shuffled properly or dealers may replace a random deck with a pre-ordered deck for the purpose of cheating the house odds. Gambling organizations such as casinos are required to employ staff who monitor gaming tables as a method of preventing cheating and collusion between players and between players and dealers. This increases the overhead required to run a physical gambling organization. Furthermore, there is no easy way of auditing the proper distribution of physical cards in play, as the card order in the deck is unknown and untraceable without physical surveillance. The use of preordered randomized hands in games of skill helps to eliminate dealer collusion in physical card games. However if the dealer, or anyone in general, is responsible for pre-ordering the cards there is a chance for foul play. The proper use of a machine for pre-ordering cards and for automated dealing of cards can thus eliminate dealer collusion and chances for foul play.

Figure 2:
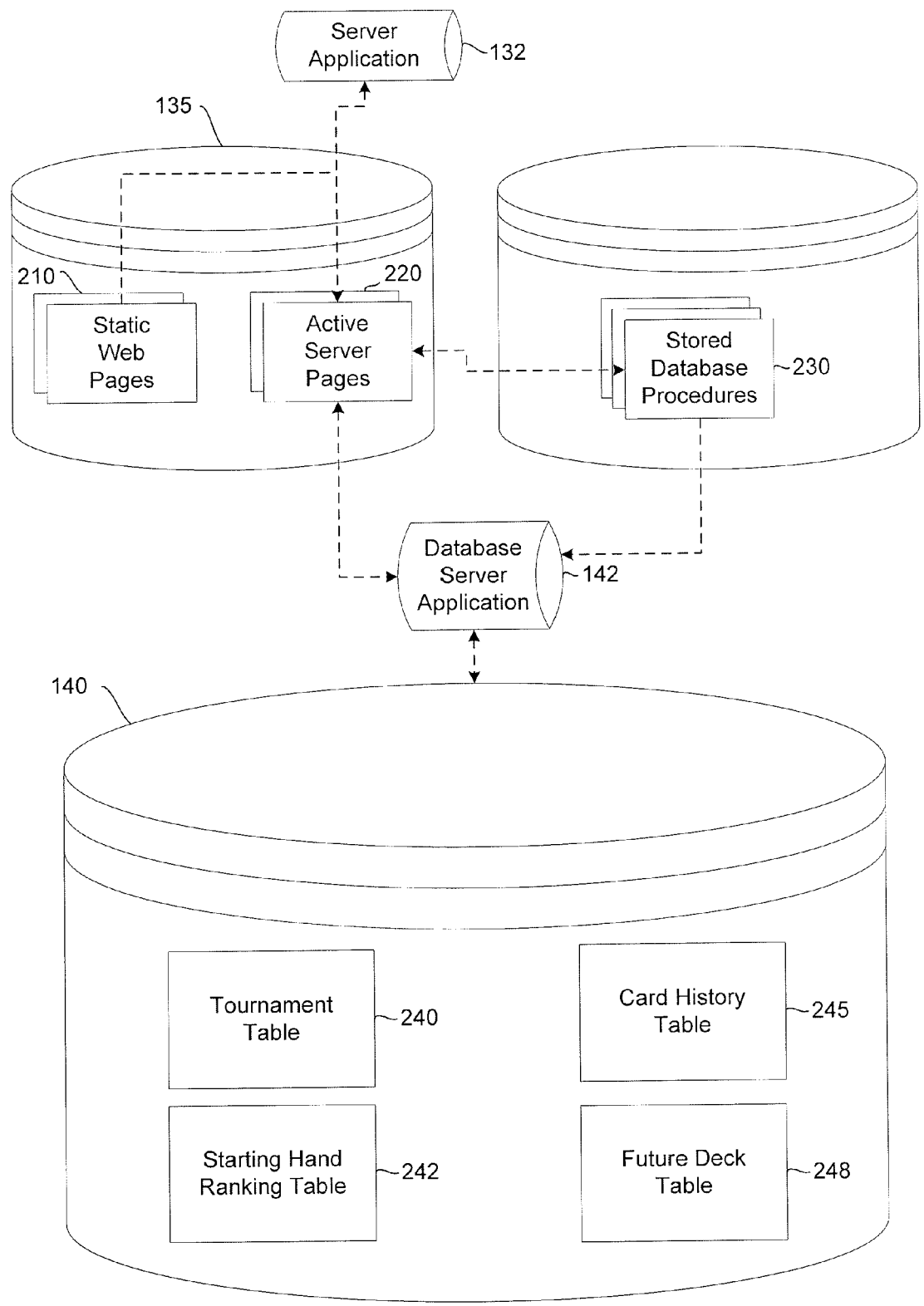
FIG. 2 is a block diagram that illustrates an interrelationship between data stored on a server computer and code modules used to run a skill game and reduce or eliminate the element of chance.

FIG. 2 is a block diagram that illustrates an interrelationship between data stored on a server computer and code modules used to run a skill game and reduce or eliminate the element of chance. Referring to FIG. 2, Web pages 135 comprise at least two types of pages. One type are static Web pages 210, that are HTML format pages passed on by server application 132 direct to a requesting Web browser without modification. The other type are dynamic or active server pages 220. An active server page 220 includes a procedure specification that, when requested by a Web browser, is executed under the control of server application 132 rather than being directly passed to the Web browser. Execution of the procedure specified by an active server page 220 produces HTML formatted information that is passed by server application 132 to a Web browser. In a preferred embodiment, active server pages 220 can be generated by a Visual Basic language procedure, CGI scripts, or a procedure written in some other programming or scripting language such as java, perl, python or php, that are executed under the control of server application 132.

Active server pages 220 can include references to services provide by database server application 142. For instance, a Visual Basic procedure in active server page 220 accesses database server application 142 through an API (application program interface) for the database server application. During execution of the stored procedure, server application 132 can access data stored in database 140. Active server pages 220 can also include references to stored database procedures 230. Each stored database procedure 230 includes one or more SQL statements. Server application 132 invokes a stored database procedure 230 during execution of an active server page 220. Database server application 142 controls the execution of stored database procedure 230 to provide data to server application 132. Together, static Web pages 210, active server pages 220, and stored database procedures 230 provide the information to generate Web pages through which a user interacts with the system. Alternatively, a dedicated, client-based application can interact with server application 132 directly, without use of a Web browser.

Database 140 includes a number of separate tables. For example, a tournament table 240 includes information related to various tournament games being run on system 130. Like all tables in a database, tournament table 240 is dynamic in that it can be modified, for example, as new games are started or as the status of various games are modified or updated.

Database 140 also includes a starting hand ranking table 242 that includes information about the relative strength of starting hands that may be dealt to players in a tournament game. For example, it is well-known that an expectation value (EV) can be calculated for a starting hand comprising two cards in the popular game of Texas Hold'em. See, e.g., "Poker Hand Ranking Chart" at www.tightpoker.com/poker_hands.html (viewed Nov. 22, 2009), incorporated by reference herein. In a further example, when there is more than two players in a Texas Hold'em game, a player's position will affect their expectation value, and therefore the relative hand strength. See, e.g., "Expected Value chart by position" at www.tightpoker.com/hands/ev_position.html (viewed Nov. 22, 2009), incorporated by reference herein.

Database 140 also includes a card history table 245 is used to keep track of the various card hands dealt to players participating in the tournament games. The relative strength of hands dealt, as explained above, may be ascertained and a history of such cards dealt may be maintained in table 245. Computer system 130 may keep track of the cards dealt in a game using table 245, and may generate, in advance of being dealt, future arrangements of card decks stored in future deck table 248 such that the relative hand strength of cards dealt to each player is adjusted so that the percentage odds of winning each hand is equalized over the course of a plurality of hands to be dealt.

Figure 3:
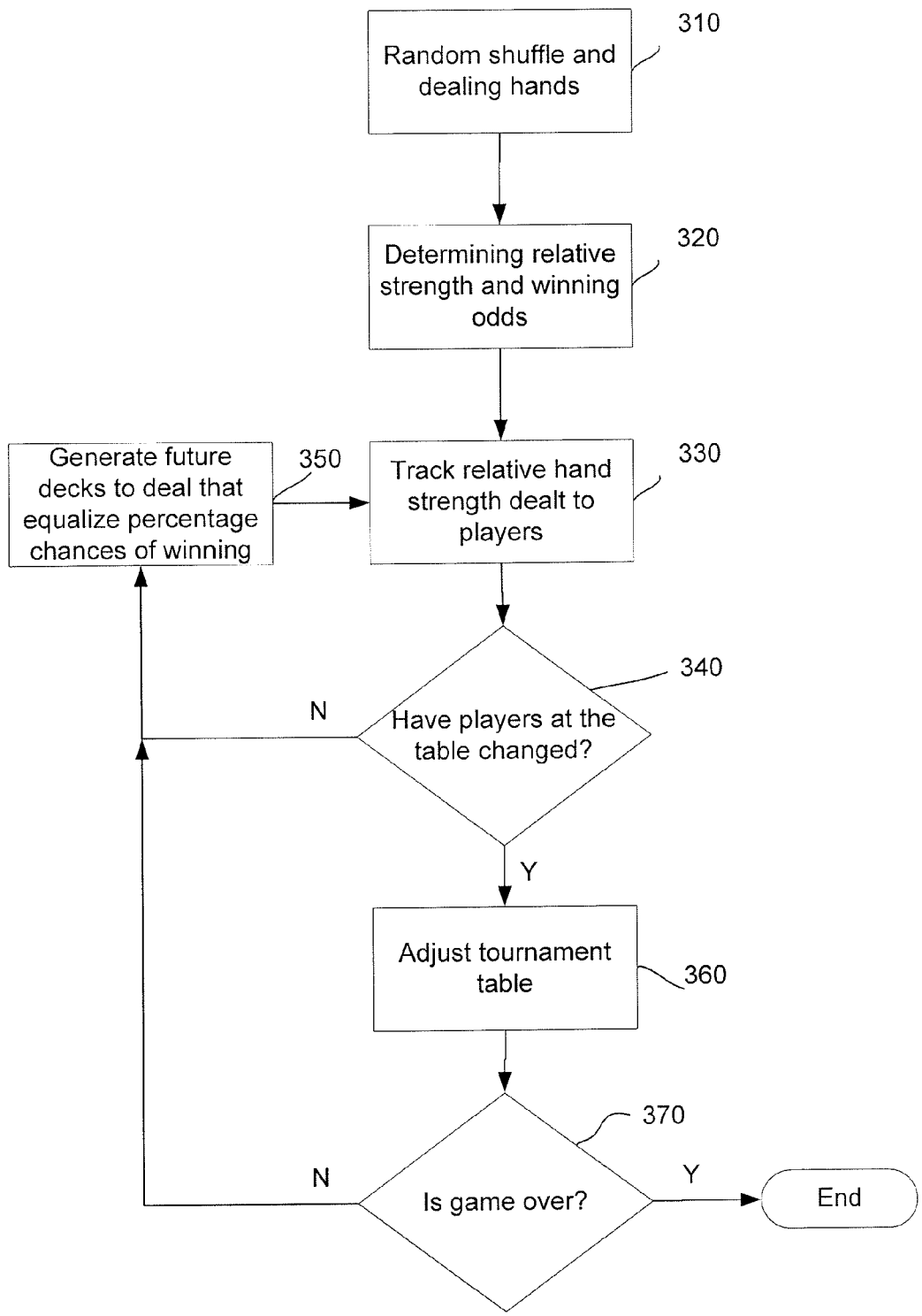
FIG. 3 is a flow chart that illustrates a preferred method for substantially removing chance from a mixed contest of chance and skill.

FIG. 3 is a flow chart that illustrates a preferred method for substantially removing chance from a mixed contest of chance and skill. In step 310, illustrated in FIG. 3, computer system 130 randomizes shuffling and deals one or more hands to players participating in what would normally would be a game of chance, such as a card game.

In step 320, computer system 130 determines the relative hand strength of the cards dealt to each player, and the odds that each player has of winning the hand based on the cards dealt. In step 330, computer system 130 keeps track of each hand dealt in the game, the relative strength of the hands dealt to each player, and the percentage chance of each player to win the hand, based on the cards dealt.

After a number of hands have been dealt, in step 340, computer system 130 determines whether any players at the game table have come or gone. If no players have changed, control passes to step 350, where computer system 130 will generate future decks of cards such that after such decks are dealt and played, each player will have had the same opportunity, expectation value, or odds to win the same number of hands as the other players at the game table. Thus, an accumulation of score, chips or points will be determined by the player's skill, rather than the luck of the draw. Control then loops through the play of such decks in steps 330, 340 and 350 until one or more players are eliminated from the game.

In step 360, the tournament is adjusted for the loss of the players that have "busted out," or have been eliminated from the game. Computer system 130 no longer needs to keep track of the players that are no longer in the game. Computer system 130 must also discard the decks that were generated to equalize the chances for all players, including those that have busted out. In step 370, computer system 130 must determine whether there are enough players left to continue the tournament, or if the game is over. If the game is not over, then control passes back to step 350, where new decks are generated for the remaining players, to equalize their chances of winning hands. Steps 330-370 are then repeated until the game is over.

In a preferred embodiment, a heads-up match is played between two players playing Texas Hold'em. As the two players hole cards are not revealed to each other, unless there is a showdown, the exact same deck may be used in a future hand, but hole cards dealt to the opposite player. For example, player 1 may be dealt at random (i.e., in step 310) AhJc (ace of hearts and jack of clubs), whereas player 2 may be dealt 7s6s (seven of spades and six of spades). In step 320, computer system 130 determines that player 1's hand has an expectation value of 0.19 and player 2's hand has an expectation value of −0.03. Computer system 130 may deal the reverse starting hand to player 1, i.e., 7s6s, and to player 2, AhJc, by setting up a new deck that, when dealt, will result in such a deal. By dealing the same hand in complimentary fashion, the odds of winning based on the starting cards will be equalized.

Figure 4A:
FIGS. 4A and 4B are screen diagrams that illustrate a hand dealt by a computer system.
Figure 4B:
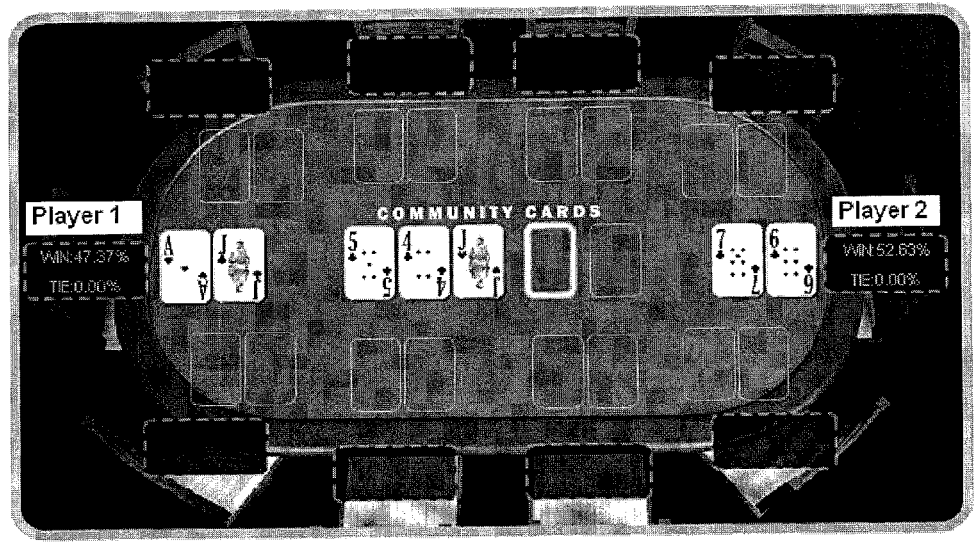

FIGS. 4A and 4B are screen diagrams that illustrate a previous hand dealt by a computer system. As shown in FIG. 4A, the above-mentioned hole cards are dealt to players 1 and 2, and the chances of player 1 winning the hand are about 60%, whereas player 2 has a 40% chance of winning. Assuming the betting action between the players leads to a flop, three community cards are dealt face up. The chances of each player winning the hand on this street can be determined based on probability. Players possessing skill can ascertain their approximate odds by determining the number of "outs," or cards presumptively remaining in the deck that the player could draw in order to improve the strength of his hand. The pre-flop betting and the flop cards are influential in a player's likelihood of remaining in the hand. As illustrated in FIG. 4B, the three community cards comprising a flop of 5c4cJh occurred, thereby resulting in player 1 having about 47% chance to win the hand, and player 2 having about 53% chance.

However, once the flop has occurred, if the exact same hand is replayed in the very next hand, the players may recognize the same flop, and they may realize the possibility that each has the other's starting hand since the objective of computer system 130 is presumptively known to the players. The situation becomes more recognizable as more cards become revealed, culminating in a showdown where even the player's starting hand, or hole cards, are revealed.

Figure 5A:
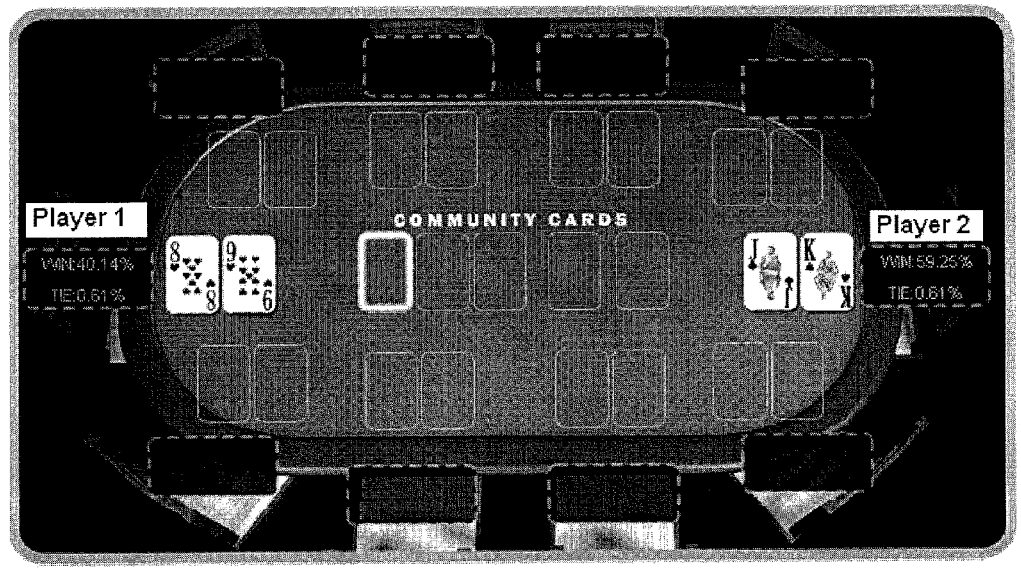
FIGS. 5A and 5B are screen images that illustrate a new hand dealt by computer system, suitable for equalizing players' chances of winning.
Figure 5B:
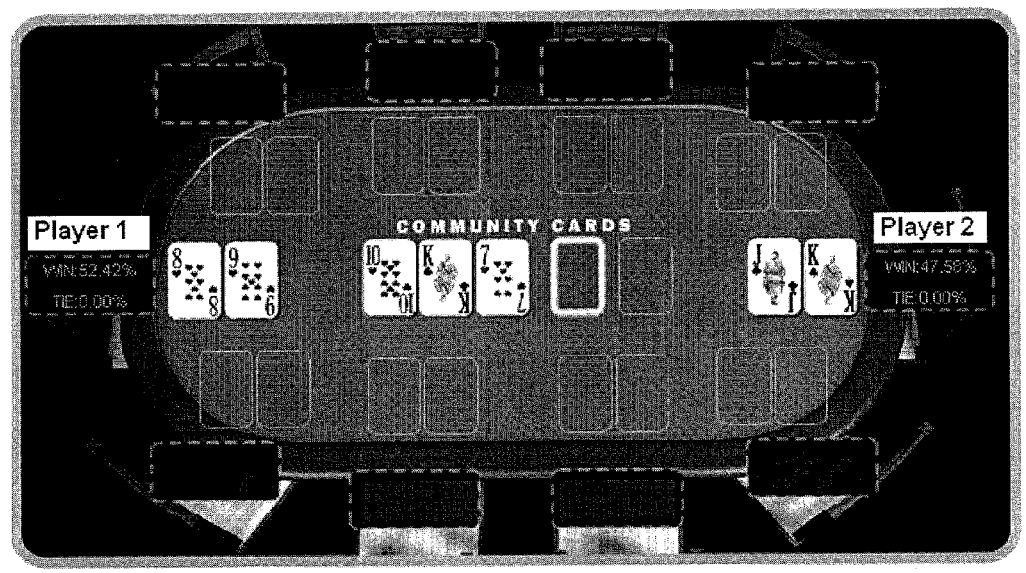

Fortunately, with the use of high-speed computer system 130, measures can be taken that are not practically possible in a real-world card game. FIGS. 5A and 5B are screen images that illustrate a new hand dealt by computer system 130, suitable for equalizing players' chances of winning. In an illustrative example, computer system 130 deals cards as shown in FIG. 5A. As shown in FIG. 5A, hole cards JcKs and 8h9h are dealt to players 2 and 1 respectively, and the chances of player 2 winning the hand are about 60%, whereas player 1 has a 40% chance of winning. Computer system 130 employs heuristics to disguise a new deck used to present another hand to the opposite players by, for example, rotating the suit of the cards in the deck. In FIG. 5A, the rank of the hole cards was slightly altered, and the suits were rotated. In particular, the suited connectors were changed from spades to hearts in player 1's hand, and the rank of the top card of player 2's hand was changed from an ace to a king. Such slight changes does not appreciably affect the odds of winning the hand for the players, but the small difference can tremendously help disguise the hand, as shown by flop cards illustrated in FIG. 5B. As shown in FIG. 5B, the three community cards comprising a flop of ThKc7h occurred, thereby resulting in player 2 having about 47% chance to win the hand, and player 1 having about 53% chance.

In addition, presentation of hole cards and flop cards can be reordered or switched to further disguise the replayed deck. As shown in FIG. 4A, the larger rank card comes first in player 1 and 2's hands, whereas the lower rank card comes first in FIG. 5A. FIG. 5B illustrates a flop that, like the hand illustrated in FIG. 4B, reverses the chances of winning the hand for the players. The card that helps one player make top pair is now in the middle instead of last, and the two cards providing the other player with the dominating straight-flush draw are in high to low rank order surrounding the middle card, as shown in FIG. 5B, rather than being next to each other, ranking from low to high as shown in FIG. 4B. Of course, the player's skill in recognizing their chances of winning the hand, and choice of betting line and amount (in a no-limit game), both skill factors, will determine which player ultimately ends up accumulating more chips in their contest between each other.

Further, computer system 130 can introduce the deal of the so-arranged deck to occur at some differing future number of hands to further disguise the similarity of the newly generated deck. In the illustrative example, computer system 130 dealt the new deal illustrated in FIGS. 5A and 5B three hands after the hand illustrated in FIGS. 4A and B, thus disguising the purpose of the new hand to equalize the winning chances of the players playing the old hand, and preserving the positional advantage afforded to the player on the button (by dealing the new deal an odd number of hands later, to ensure a switch of the dealer button), who gets to act last in the betting after the flop.

Further, computer system 130 may determine that a showdown has occurred with a previously played deck, and may generate a different set of hole cards, flop, turn and river cards such that the same odds of winning the hand on each street is the same for player 2 as it was for player 1 in a historical hand, as illustrated in FIGS. 5A and 5B.

In addition, equalization of the relative expectation value, or odds of winning the hand, can be spread over more than one hand by computer system 130, so that after a certain number of hands, the expectation value for the two players is approximately equal.

In an alternative embodiment, only the starting hands (i.e., hole cards) are considered when equalizing the players chances in a heads-up game. The slight differences in the hand percentages can be accumulated and equalized. In yet another embodiment, the odds on every street played in the hand is equalized by the subsequent new hand or hands.

As is known by one with skill in the art of probability and game theory, it is possible for computer system 130 to extend the heuristics described above to a six-player or full-ring (10 player) Texas Hold'em game, so that the percentage chances of winning the same number of hands is equalized among all players participating at the gaming table interface. In addition, computer system 130 can run a multi-table tournament where players are moved to other tables during the course of the tournament. In this instance, the new decks generated previously generated should be discarded and new decks generated based on the combined history of the players now at gaming table, for the remaining players to equalize their chances of winning hands, as illustrated in FIG. 3, steps 360, 370 and 350.

In addition, the techniques presented here in the context of a heads-up Texas Hold'em game can be extended to other games, including but not limited to seven card stud, low ball deuces to seven, balduci, Omaha, HORSE, to other card games besides poker such as gin rummy, spades, canasta, euchre, hearts, pinochle. Further, the techniques presented herein may also be extended to other mixed games of skill and chance involving dice, dominoes, letter tiles or other random-variable generating instrumentalities that introduce chance and involving player's actions, such as betting, forming words for scoring points or moving game pieces on a game board, such as backgammon, BOGGLE,™ YAHTZEE,™ or SCRABBLE,™ all of which require a player's application of skill when making choices. The computer server may use reference materials to assist with the equalization and minimization of the apparent element of chance, by for example, consulting reference materials, such as a dictionary to determine all possible combinations of words made playable in the language of the game, or make combinatorical, brute-force determinations to determine possible moves of game pieces on board games. Further, the apparent random selection of dice, dominoes, letter tiles, or other random-variable generating instrumentalities can be delayed during play to ensure that the computer can minimize or eliminate the element of chance. For example, SCRABBLE™ players normally take turns drawing tiles from a bag before the first player takes their turn playing tiles. In an embodiment of the present invention, tiles can be provided to the player after the player before them has played their tiles, and time limits may be set for the current player to play the tiles provided. The computer server can ensure that each player can be provided tiles from the remaining tiles when it is their turn, such that each player is provided with an opportunity to score an equal amount of points when playing tiles, thereby relying on the player's skill in playing tiles rather than the random provisioning of tiles.

Software on Media

Figure 6:
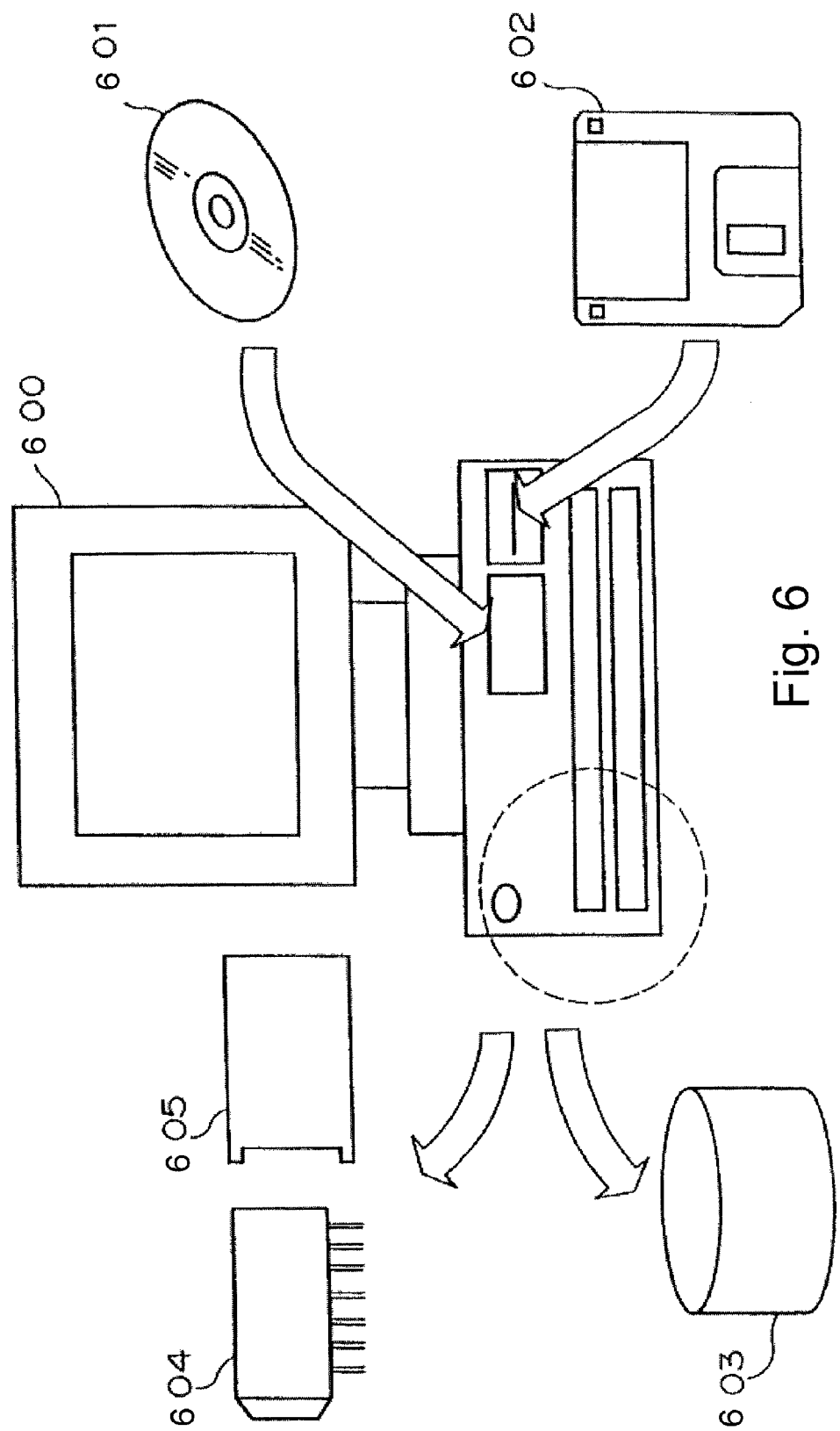
FIG. 6 illustrates examples of computer-readable media.

In the specification, the term "media" means any computer-readable medium that can record data therein. FIG. 6 illustrates examples of recordable computer-readable media.

The term "media" includes, for instance, a disk shaped media for 601 such as CD-ROM (compact disc-read only memory), magneto optical disc or MO, digital video disc-read only memory or DVD-ROM, digital video disc-random access memory or DVD-RAM, a floppy disc 602, a memory chip 604 such as random access memory or RAM, read only memory or ROM, erasable programmable read only memory or E-PROM, electrical erasable programmable read only memory or EE-PROM, a rewriteable card-type read only memory 605 such as a smart card, a magnetic tape, a hard disc 603, and any other suitable means for storing a program therein.

A recording media storing a program for accomplishing the above mentioned apparatus maybe accomplished by programming functions of the above mentioned apparatuses with a programming language readable by a computer 600 or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer 600, any suitable device for performing computations in accordance with a computer program may be used. Examples of such devices include a server, a personal computer, a laptop computer, a nettop computer, a microprocessor, a programmable logic device, or an application specific integrated circuit.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A computer system enabling players to play a word game, comprising:
   a processor;
   a memory;
   a computerized gaming table interface comprising a display; and
   software stored on a non-transitory computer readable medium that, when loaded into the memory and run by the processor, causes the processor to perform the steps of:
      pseudo randomized mixing and dealing of representations of tiles from a plurality of tiles, each tile having a letter and a point value, to each player taking turns playing tiles on a representation of a game board for the word game, the board having multipliers for tiles or words played thereon, the placing of tiles resulting in a score;
      determining possible scores for each player's turn from tiles dealt to each player, available spaces for playing tiles on the board, and multipliers;
      tracking possible scores available to each player; and
      creating an ordered arrangement of tiles to provide to each player from tiles remaining in the plurality of tiles, such that each player is provided with an opportunity to score an equal amount of points when playing tiles.

2. The computer system of claim 1, wherein the software stored on the non-transitory computer readable medium, when loaded into the memory and run by the processor, causes the processor to perform additional steps of comparing tiles held by each player to a dictionary to determine all possible combinations of words that can be played.

3. The computer system of claim 2, wherein the software stored on the non-transitory computer readable medium, when loaded into the memory and run by the processor, causes the processor to perform additional steps of equalizing a maximum possible score that each player may attain during a single round of play.

4. The computer system of claim 2, wherein the software stored on the non-transitory computer readable medium, when loaded into the memory and run by the processor, causes the processor to perform additional steps of equalizing a maximum possible score that each player may attain over a course of a number of rounds of play.

5. The computer system of claim 1, further comprising a separate display for each player.

6. The computer system of claim 5, wherein each display is coupled to the processor through an Internet.

7. The computer system of claim 1, wherein each player participates in the game on the display at the computerized gaming interface.

8. A computerized method for players to play a word game, comprising:
   a computer pseudo randomized mixing and dealing of representations of tiles from a plurality of tiles, each tile having a letter and a point value, to each player taking turns playing tiles on a representation of a game board for the word game, the board having multipliers for tiles or words played thereon, the placing of tiles resulting in a score;
   the computer determining possible scores for each player's turn from tiles dealt to each player, available spaces for playing tiles on the board, and multipliers;
   the computer tracking possible scores available to each player; and
   the computer creating an ordered arrangement of tiles to provide to each player from tiles remaining in the plurality of tiles, such that each player is provided with an opportunity to score an equal amount of points when playing tiles.

9. The method of claim 8, further comprising the computer comparing tiles held by each player to a dictionary to determine all possible combinations of words that can be played.

10. The method of claim 9, further comprising the computer equalizing a maximum possible score that each player may attain during a single round of play.

11. The method of claim 9, further comprising the computer equalizing a maximum possible score that each player may attain over a course of a number of rounds of play.

12. The method of claim 8, wherein the players play the word game on separate displays over an Internet.

13. The method of claim 8, wherein the players play the word game at a computerized gaming interface coupled to the computer.

14. A computer system for playing a skill-based Scrabble tournament on the Internet, the system comprising:
   a computer server comprising a processor and memory;
   at least one player's computer in communication with the computer server the computer server over the Internet, the computer comprising a display and a user interface; and
   software stored on one or more non-transitory computer-readable media, which when loaded into the computer server memory and player's computer and run by the processor and player's computer, causes the processor to perform the steps of:
      pseudo randomized mixing and dealing of representations of tiles from a plurality of tiles, each tile having a letter and a point value, to each player taking turns playing tiles on a representation of a game board for the word game, the board having multipliers for tiles or words played thereon, the placing of tiles resulting in a score;
      determining possible scores for each player's turn from tiles dealt to each player, available spaces for playing tiles on the board, and multipliers;
      tracking possible scores available to each player; and
      creating an ordered arrangement of tiles to provide to each player from tiles remaining in the plurality of tiles, such that each player is provided with an opportunity to score an equal amount of points when playing tiles.

* * * * *